Aug. 2, 1966  D. F. G. MANSFIELD ETAL  3,263,408
WINDING AND DOFFING APPARATUS
Filed July 23, 1965  5 Sheets-Sheet 1

INVENTORS
DAVID FRANCIS GILBERT MANSFIELD
THOMAS HENRY ROBERTS BROWNING
ROY SMITH
TERENCE G. DAVIES

BY
ATTORNEYS

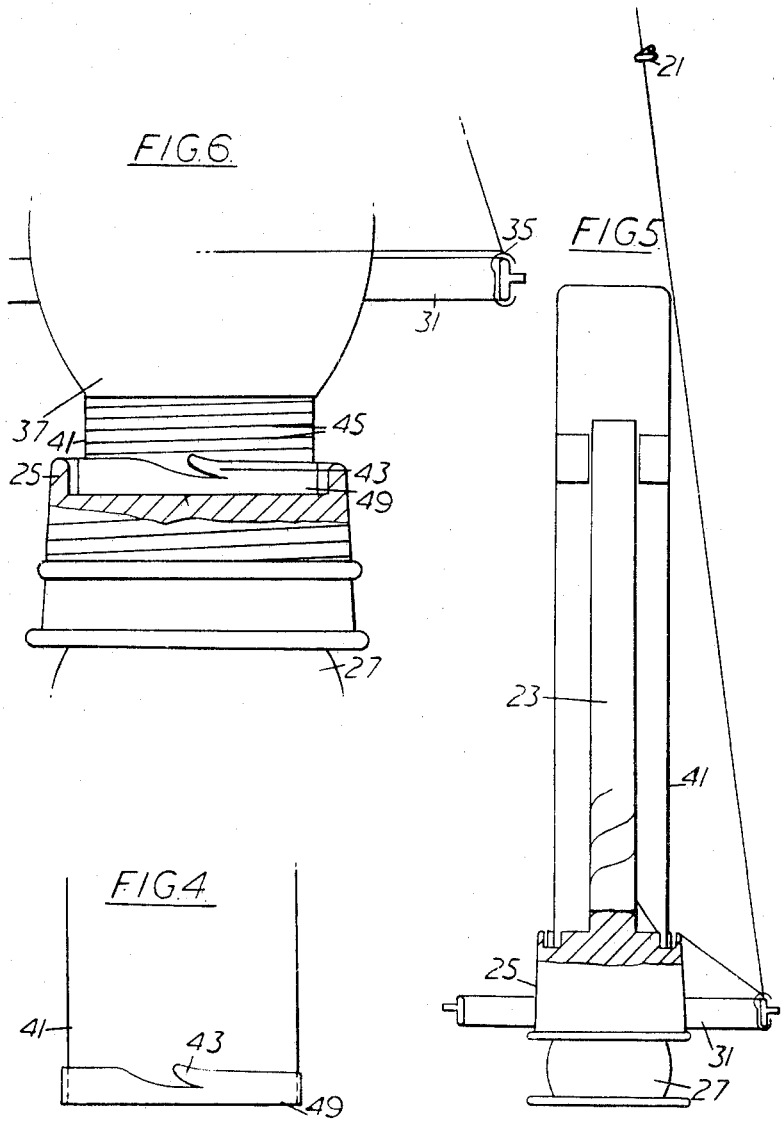

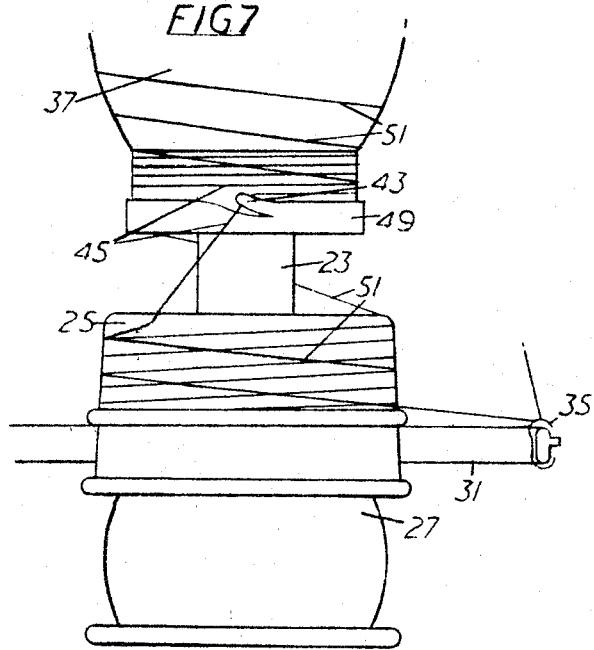
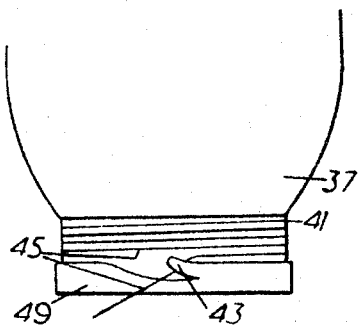
INVENTORS
DAVID FRANCIS GILBERT MANSFIELD
THOMAS HENRY ROBERTS BROWNING
ROY SMITH
TERENCE G. DAVIES
BY *Cushman, Darby & Cushman*
ATTORNEYS

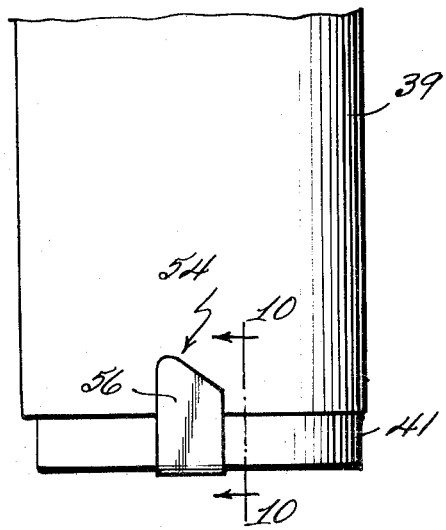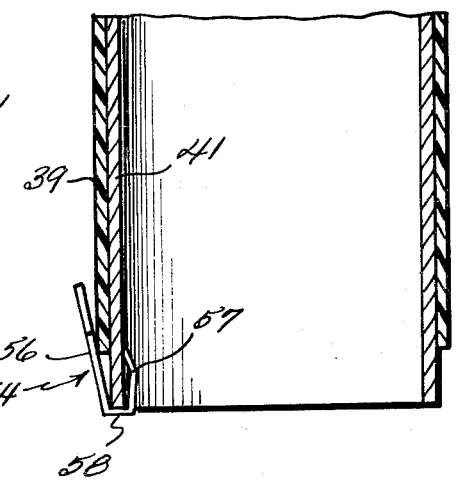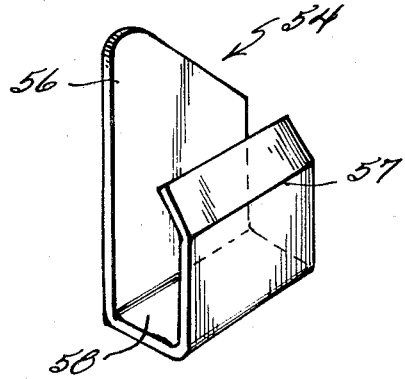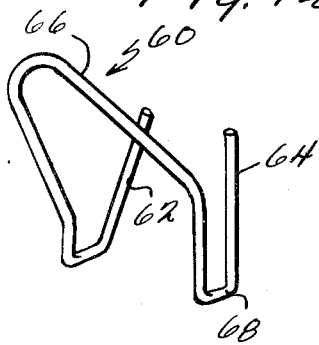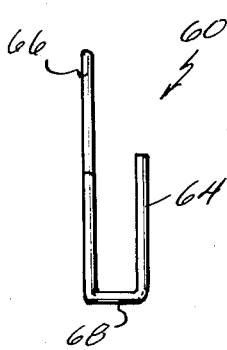

United States Patent Office 3,263,408
Patented August 2, 1966

3,263,408
WINDING AND DOFFING APPARATUS
David F. G. Mansfield, Pontypool, Thomas H. R. Browning, Monmouth, Roy Smith, Newport, and Terence G. Davies, Croesyceiliog, England, assignors to British Nylon Spinners Limited, Pontypool, England
Filed July 23, 1965, Ser. No. 478,018
Claims priority, application Great Britain, Aug. 19, 1964, 33,871/64
13 Claims. (Cl. 57—34)

This is a continuation-in-part of application Serial No. 223,710 filed September 14, 1962, now abandoned. The present invention concerns improvements in or relating to winding apparatus and bobbins.

It is well known that during the winding of bobbins of yarn for use, for instance, as warping yarn, the first turns of yarn wound on to the bobbin are wound separately from the main body of yarn in order to provide an available tail of yarn for use in connecting the last length of yarn to be withdrawn from the bobbin with the leading end of yarn of another bobbin.

In order that the yarn at this tail end shall run freely when the time comes for it to be withdrawn, it is important that the tail shall be comprised of properly-spaced helical turns on the bobbin surface that will not jam on withdrawal; and it is the main object of the present invention to provide a winding apparatus having a bobbin construction which ensures that a tail is properly formed and secured in plane at one end of the bobbin during doffing.

It is a more specific object to provide winding apparatus of the ring spindle type having a bobbin which is constructed with a slot formed in a radial projection on the surface of the bobbin so that spaced helical turns on the lower end of the bobbin will be secured by the lowermost turn being trapped in the slot as the bobbin is doffed, the helical turns constituting a transfer tail. The slot faces generally in the direction opposite to the direction of rotation of the bobbin whereby when the bobbin is not rotating and is moved upwardly during a doffing operation, the lowermost of the helical turns will tend to unwind in the direction in which the bobbin was rotated and will become trapped in the slot.

It is another object of the present invention to provide a small clip for a bobbin which when manually slipped over the lower edge of the bobbin becomes clamped thereto and forms a slot for the purpose described above. The clip may be constructed of metal wire, plastic sheet or metal sheet.

The invention will be further understood from the following detailed description taken with the drawings in which:

FIGURE 4 is a fragmentary view of a bobbin showing a projection formed by a rubber band at the base of the bobbin;

FIGURE 5 is a diagrammatic elevational view, partly in section, of a ring spindle at the start of a winding operation;

FIGURES 6, 7 and 8 are fragmentary views of the lower portion of the apparatus of FIGURE 5 during a subsequent part of the winding operation, at the start of doffing, and on completion of doffing, respectively;

FIGURE 9 is a fragmentary view of the lower portion of a bobbin having a clip which forms a slot between it and the outer surface of the bobbin;

FIGURE 10 is a sectional view taken on the line 10—10 of FIGURE 9;

FIGURE 11 is a perspective view of the clip of FIGURE 9;

FIGURE 12 is a front view of a different form of clip; and

FIGURE 13 is an end view of the clip of FIGURE 12.

Figure 1:
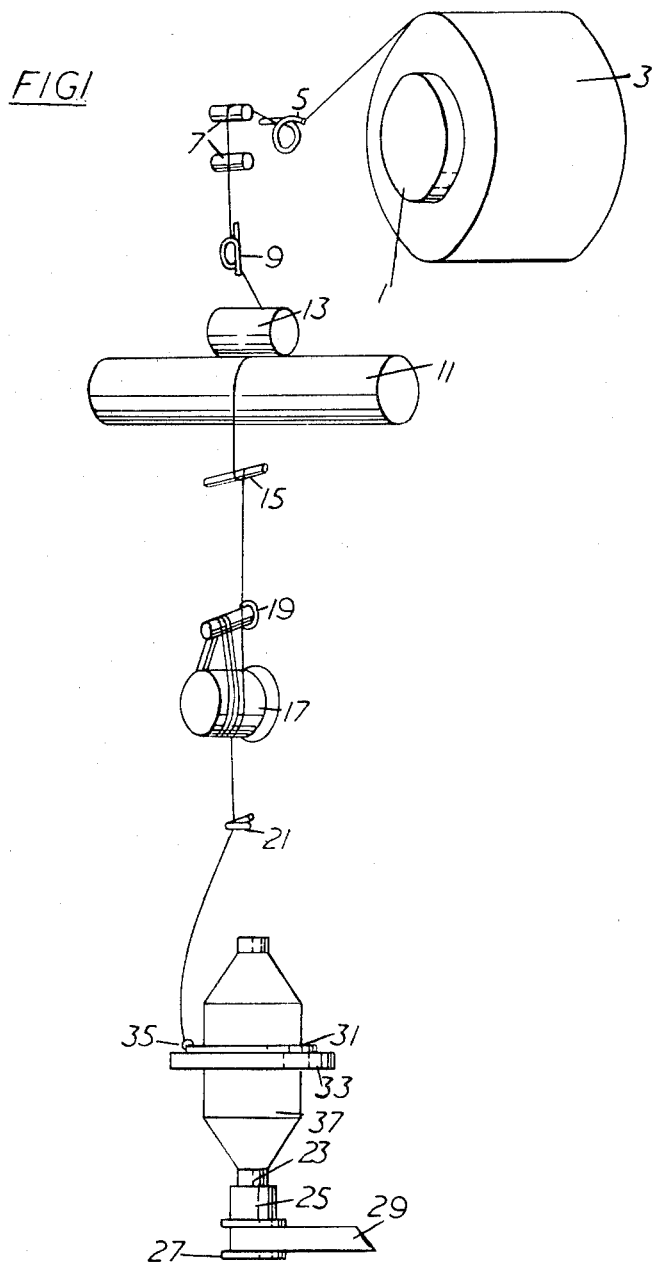
FIGURE 1 is a diagrammatic elevational view of a drawing (stretching) apparatus.

The drawing (stretching) apparatus depicted in FIGURE 1 comprises a holder 1 for cake 3 of undrawn synthetic yarn, yarn guide 5, tension bars 7, and traverse guide 9 for traversing the undrawn yarn across feed roll 11. Nip roll 13, acting in conjunction with feed roll 11, ensures that the undrawn yarn is forwarded positively. Snubbing pin 15 is positioned intermediate the feed roll 11 and draw roll 17, around which and separator roll 19, the yarn is wound with a number of wraps. Thence, the drawn yarn proceeds via balloon guide 21 to be wound up by the ring spindle apparatus comprising rotatable spindle 23, with waste spool 25 at the base thereof, whorl 27, around which driving belt 29 is passed, and ring 31 held in holder 33 and around which traveller 35 rotates. The yarn is wound in package 37 on a bobbin (not shown) affixed to spindle 23, as the latter rotates counterclockwise as viewed from above.

It is explained that the initial lengths of yarn produced at the start of winding will be either undrawn or incompletely drawn, and these are the lengths which are wound on the waste spool. Such winding is effected by a lowering of the traveller ring, either individually or as one of a number of such rings held by a ring rail, to below its ordinary operating traverse range; and such ring is slowly raised to operating position, once the drawing operation has started to run smoothly, thus producing the series of spaced helical turns connecting the yarn on the waste spool with the yarn in the main build. The yarn is then wound into the main build by traversing it in the required manner along the main middle portion of the bobbin; and when the required amount of yarn has been so wound, the ring is lowered to the level of the waste spool, the end of yarn is severed and winding ceases. The spindle is then braked to bring it to rest for the doffing of the bobbin which is carried out by lifting the bobbin vertically for a short distance, either by hand or with the assistance of a doffing tool, until it can be removed from the spindle.

Although only one radial projection has been referred to above, it is in fact preferred to use at least two of them, to ensure that the helix of yarn is readily trapped; and the actual form to be taken by a projection, apart from the basic requirements that it shall project slightly from the cylindrical periphery of the lower end-portion of the bobbin and that the line of direction of the slot towards its open end shall intersect the line of direction of yarn in the helical turns, will depend on the type of bobbin in use. For the most part, producers' bobbins employed in the winding of synthetic yarns such as nylon are cylindrical tubes without flanges; and they may be composed of plastic or cardboard sleeves fitting closely on a metal core, or of a metal tube itself. It is a relatively simple matter to form or to cut projections in the sleeves; but in the case of all-metal bobbins it is necessary to fit a sleeve or band over the lower end-portion of the bobbin, this sleeve or band having the projection or projections formed in it.

Figure 2:
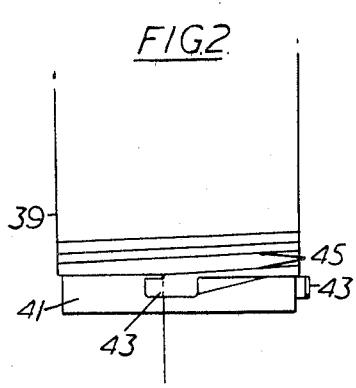
FIGURES 2, 2A, 2B and 3 are fragmentary views of bobbins each showing a different form of projection for forming a slot.
Figure 2A:
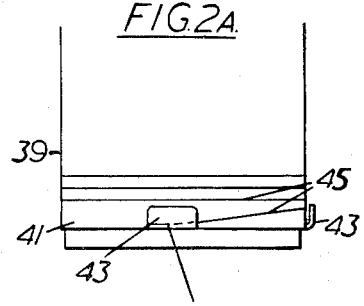
Figure 2B:
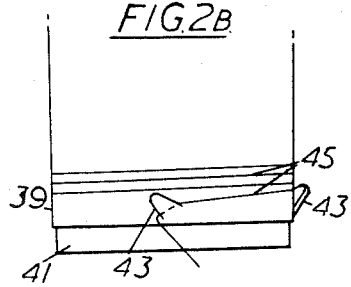
Figure 3:
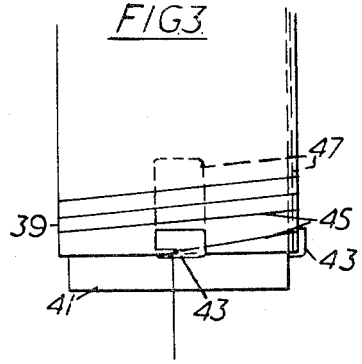

In connection with FIGURES 2–4, and considering firstly bobbins composed of a plastic sleeve 39 and metal core 41, it is possible to make the sleeve with the projection or projections 43 integral therewith and extending below the base thereof from its periphery. Such projections, as shown in FIGURES 2 and 2A, having a slot formed along the line of the periphery and half the width of the projection in length, can be raised slightly to stand out from the surface of the bobbin (FIGURE 2) or they can be bent right over upwardly (FIGURE 2A), the latter arrangement providing a more positive means for engagement with the helical coils 45. Alternatively, as shown in FIGURE 2B, V-shaped flaps 43 can be punched out of the base of the sleeve 39, with the apex of the V pointing upwardly and sideways so as to provide a slot into which the helical coil or coils will be drawn on doffing the bobbin. In yet another alternative, as shown in FIGURE 3, which can also be employed with cardboard sleeves, a small strip 47 of plastic material can be wedged between the sleeve 39 and the plastic cone-shaped fitting at the base of the metal core 41 so as to project below the end periphery of the sleeve, and this strip, having a slot cut through half its width along the line of the periphery, is then bent right over upwardly to form a projection 43 in the same way as described above for the integral projections.

For the all-metal bobbins, as well as for those consisting of a sleeve fitted on a metal core, a plastic sleeve can be pressed over the base of the bobbin, this sleeve having diagonal slots cut in one or two places around its upper periphery. It is possible, as shown in FIGURE 4, to use a stretched rubber band 49 or an expansible metal clip around the lower end-portion of the bobbin 41 instead of a plastic sleeve pressed over its base, the rubber band or metal clip having notches cut in its upper periphery in the same way as the plastic sleeve, to form projections 43 which stand out sideways from the band or clip.

The operation of the winding and doffing of a bobbin according to the invention is described with reference to FIGURES 5-8.

At the start of winding, as shown in FIGURE 5, the machine is threaded-up by passing the yarn round the feed and draw rolls (see FIGURE 1) through the guide 21 and traveller 35, and then the yarn is anchored by being wound around the spindle blade 23. The bobbin 41 is then loaded onto the spindle.

The machine is then started so as to rotate the waste spool 25 and the bobbin 41 counterclockwise as viewed from above. The ring 31, which may be controlled by an automatic bunch winder, remains stationary long enough for the undrawn and off-standard yarn produced during start-up to be wound onto the waste spool 25. The ring 31 is then raised and while rising it winds a spiral of yarn 45 over the waste spool 25 and the lower portion of the bobbin 41, as shown in FIGURE 6. At this time, the rubber band 49, with its projection 43 and its slot, is shielded by the wall of the waste spool 25, so that no yarn can come in contact with it. The ring rail then moves in a specified pattern of traverse motion, to produce the required type of package 37.

At the completion of winding, and while the machine is slowing down to rest, the ring 31 is lowered to the waste spool position that it was in at the start of the winding operation. This lowering of the ring, as shown in FIGURE 7, causes a wide-angled helix 51 of yarn to be wound, firstly over the lower portion of the package 37, next over the helical turns 45 on the lower portion of the bobbin 41 and then over those turns on the waste spool 25.

To doff the bobbin (i.e. the bobbin 41 on which is wound yarn package 37) it is lifted upwardly along the spindle 23. This causes both the helical turns 45 and the wide-angled helical turns 51 to unwind somewhat and to slip where they are wound on the lower portion of the bobbin 41. The two spirals do, however, unwind in opposite directions. As shown in FIGURE 7, one turn of the spiral 45 becomes engaged with the outwardly-extending projection 43, enters the slot in the band 49 and is trapped therein. The turns of the wide-angled helix 51, unwinding in the opposite direction, slide over the projection 43 and do not enter the slot. The trapping of the yarn in the slot will be felt by the operative as he lifts the bobbin, and he knows that he can then cut the yarn in both spirals below the band 49. Thus, as shown in FIGURE 8, the end 51 is free and the end 45 is trapped in the slot. Such trapping of the end 45 in this manner is quite secure enough for the ordinary incidents of handling; and no other means is required to secure the helical turns in place. These turns, comprising a transfer "tail," are thus prepared on the ring spindle apparatus in the manner in which they are required for use in a subsequent textile operation such as warping.

Referring to FIGURES 9 and 10 there is shown a generally U-shaped metal clip 54 fastened around the lower circular rim of a bobbin with an arm 56 of the clip facing upwardly to trap the yarn end in a slot formed between the arm 56 and the bobbin surface. The clip 54 is formed from a thin metal plate bent over on itself to form two portions at 180° to one another, these portions being the arm 56 and a somewhat shorter arm 57. Between the arms 56 and 57, where the clip is in contact with the flat annulus of the rim of the bobbin, there is a short flat section 58 which permits the clip to fit easily but firmly around the rim. The upper portion of the arm 57 is bent slightly toward the arm 56 so as to tightly engage the inner surface of the metal core 41 of the bobbin. The slot is formed by virtue of a slight angular relationship between the arm 56 and the bobbin sleeve 39, this relationship occurring as a result of the clamping action of the inner arm 57 against the core 41.

Preferably the top of the arm 56 is defined by a single curved piece inclined somewhat sideways to approach the normal to the lay of the yarn in the helical coils of the transfer tail. This slight sideways direction of the top of the arm 56 not only assists the trapping of the coil or coils of the transfer tail but also assists in the rejection from the slot of the final coils wound around the base of the bobbin prior to doffing.

Another advantage of the clip 54 lies in the fact that it provides a circumferentially movable trapping device for the tail end of the yarn. This capability to move around the circumference of the rim of the lower end of the bobbin is helpful in obtaining an unfrayed end of yarn. Such a desirable result can be achieved, e.g. on a creel, either by sliding the clip off the cut end of the yarn, or by sliding the clip in the reverse direction so as to ruck up the trapped coil of yarn in the transfer tail, to enable it to be cut anew. An unfrayed end of yarn is desirable for ease in joining and for subsequent processing free from trouble due to splayed filaments. In contradistinction to fixed means for securing transfer tails, the slideable securing of the clip of the present invention is unique in the manner in which it facilitates this result.

FIGURES 12 and 13 illustrate a wire clip 60 which has the same general configuration and the same advantages as the solid clip 54 of FIGURES 9 and 10. The wire clip 60, in the nature of a paper clip, is formed from a single length of stiff wire the two ends of which are bent to form equal length shanks 62 and 64 which correspond in function and location to the arm 57 of the solid clip 54. The middle portion of the wire is bent to conform to the outline of the remainder of the clip 54, a curved portion 66 corresponding to the arm 56 and two straight portions 68 corresponding to the flat portion 58.

If desired, the top of the upwardly-directed outer portion 66 of the clip 60 may be splayed outwardly from the surface of the bobbin to ensure entrapment of the coil or coils of the transfer tail at doffing. With fine denier yarns of nylon, however, this feature has not been found to be essential.

While various embodiments of the invention have been described the details thereof are not intended to be limiting except as they appear in the appended claims.

What is claimed is:

1. In a winding apparatus for filamentary material, a flangeless rotating receiving bobbin disposed in a generally vertical position and adapted to have a transfer tail wound on the lower end portion thereof in the form of spaced helical turns of yarn, and a transverse mechanism to guide the filamentary material for collection upon said bobbin, said bobbin having means on its lower end portion for automatically receiving and securing the lowermost of said helical turns as the same tends to slip off the lower end of the bobbin upon upward movement of the bobbin during doffing, said means including a radial projection on the surface of the lower end portion of said bobbin, said projection forming a slot which has an open end facing opposite the direction of winding of said helical coils whereby when said bobbin is not rotating and is moved upwardly during a doffing operation, said lowermost helical turn will tend to unwind in the direction in which said bobbin was rotated and will become trapped in said slot.

2. Apparatus as in claim 1 wherein said slot and projection face both upwardly and tangentially.

3. Apparatus as in claim 1 wherein said means for automatically receiving and securing the lowermost helical turn of yarn includes a circular expansible band member surrounding and engaging the lower end portion of said bobbin, said band member having an inclined notch cut in its upper periphery to define said slot and said projection.

4. Apparatus as in claim 3 wherein said band member is a rubber band.

5. Apparatus as in claim 1 wherein said bobbin comprises a sleeve carried on a rigid core, said radial projection being a tab cut from and integral with the lower edge of said sleeve.

6. Apparatus as in claim 1 wherein said bobbin comprises a sleeve carried on a hollow cylindrical core having an exposed lower rim and wherein said projection is a removable clip having inner and outer arms clamping said rim between them, said outer arm extending upwardly to a location opposite the lower end of said sleeve and extending upwardly and slightly outwardly to form said slot.

7. Apparatus as in claim 6 wherein said clip is a solid plate bent to form said arms.

8. Apparatus as in claim 6 wherein said clip is a stiff wire bent to form said arms, each of said arms including two parallel lengths of wire.

9. A clip for releasable attachment to a bobbin having a hollow cylindrical lower rim, said clip comprising two spaced apart, upwardly extending arms adapted to frictionally engage the inner and outer surfaces of the rim of the bobbin and having free upper ends, said clip further comprising an intermediate portion integral with said arms at the other ends thereof and adapted to engage the annular portion of the rim, said clip when attached to the rim forming a slot between the outer surface of the bobbin and the free end of the adjacent arm.

10. A clip as in claim 9 in which one of said arms is longer than the other arm, the edge of the free end of the longer arm being inclined downwardly.

11. A clip as in claim 9 in which said clip is a solid plate.

12. A clip as in claim 9 in which said clip is constructed of stiff wire.

13. A bobbin with yarn wound in a package thereon, said bobbin including a sleeve carried on a hollow cylindrical core which projects outwardly beyond the lower end of said sleeve to define a rim, said yarn package having a transfer tail comprising spaced helical turns of yarn on the lower end portion of said bobbin; and means on the lower end portion of said bobbin for automatically receiving and securing the lowermost of said helical turns as the latter tends to slip off the lower end of said bobbin upon upward movement of said bobbin during doffing, said means including a clip releasably carried by the lower end portion of said bobbin, said clip being generally U-shaped in end view and having an upwardly extending inner arm frictionally engaging the inner surface of the rim of said bobbin, an outer arm extending upwardly to a location adjacent the lower end of said sleeve and frictionally engaging the outer surface of said bobbin and an intermediate portion integral with said arms and engaging the lower annular edge of said rim, the upper end of said outer arm forming with the outer surface of said bobbin a slot which has an open end facing opposite to the direction of winding of said helical turns whereby said lowermost helical turn becomes trapped in said slot upon upward movement of said bobbin.

References Cited by the Examiner

UNITED STATES PATENTS

| 2,822,662 | 2/1958 | Farrady | 57—34 |
| 2,898,054 | 8/1959 | Rea | 242—18 |
| 2,987,267 | 6/1961 | Hayes et al. | 242—125.1 |
| 3,003,715 | 10/1961 | Seigle | 242—125.1 |
| 3,018,973 | 1/1962 | Bradley | 242—125.1 |
| 3,032,292 | 5/1962 | Levinson | 242—125.2 |
| 3,051,411 | 8/1962 | Atwood et al. | 242—125.1 |

FRANK J. COHEN, *Primary Examiner.*

D. E. WATKINS, *Assistant Examiner.*